United States Patent
Jayaraman et al.

(10) Patent No.: US 11,501,452 B2
(45) Date of Patent: Nov. 15, 2022

(54) MACHINE LEARNING AND VISION-BASED APPROACH TO ZERO VELOCITY UPDATE OBJECT DETECTION

(71) Applicant: Honeywell International Inc., Charlotte, NC (US)

(72) Inventors: Vegnesh Jayaraman, Edina, MN (US); Sai Krishnan Chandrasekar, Minneapolis, MN (US); Andrew Stewart, Chanhassen, MN (US); Vijay Venkataraman, Excelsior, MN (US)

(73) Assignee: Honeywell International Inc., Charlotte, NC (US)

( * ) Notice: Subject to any disclaimer, the term of this patent is extended or adjusted under 35 U.S.C. 154(b) by 92 days.

(21) Appl. No.: 16/989,264

(22) Filed: Aug. 10, 2020

(65) Prior Publication Data
US 2022/0044424 A1  Feb. 10, 2022

(51) Int. Cl.
*G06T 7/00* (2017.01)
*G06T 7/292* (2017.01)
(Continued)

(52) U.S. Cl.
CPC ............ *G06T 7/292* (2017.01); *G06K 9/6267* (2013.01); *G06N 3/08* (2013.01); *G06T 7/521* (2017.01);
(Continued)

(58) Field of Classification Search
CPC ............... G06T 7/292; G06T 7/521; G06T 2207/10028; G06K 9/00791; G06K 9/6267; G06N 3/08
See application file for complete search history.

(56) References Cited

U.S. PATENT DOCUMENTS

| 8,948,446 | B2 | 2/2015 | Susca et al. |
| 9,531,962 | B2 | 12/2016 | Sezer et al. |

(Continued)

FOREIGN PATENT DOCUMENTS

| CN | 109035287 A | 12/2018 |
| CN | 110658353 A | 1/2020 |

(Continued)

OTHER PUBLICATIONS

Fischer et al, FlowNet: Learning Optical Flow with Convolutional Networks, arXiv:1504.06852v2 (Year: 2015).*

(Continued)

*Primary Examiner* — Nancy Bitar
*Assistant Examiner* — Xiao Liu
(74) *Attorney, Agent, or Firm* — Fogg & Powers LLC

(57) ABSTRACT

Techniques for detecting motion of a vehicle are disclosed. Optical flow techniques are applied to the entirety of the received images from an optical sensor mounted to a vehicle. Motion detection techniques are then imposed on the optical flow output to remove image portions that correspond to objects moving independent from the vehicle and determine the extent, if any, of movement by the vehicle from the remaining image portions. Motion detection can be performed via a machine learning classifier. In some aspects, motion can be detected by extracting the depth of received images in addition to optical flow. In additional or alternative aspects, the optical flow and/or motion detection techniques can be implemented by at least one artificial neural network.

20 Claims, 5 Drawing Sheets

(51) Int. Cl.
  *G06T 7/521* (2017.01)
  *G06V 20/56* (2022.01)
  *G06K 9/62* (2022.01)
  *G06N 3/08* (2006.01)

(52) U.S. Cl.
  CPC .... *G06V 20/56* (2022.01); *G06T 2207/10028* (2013.01)

(56) References Cited

U.S. PATENT DOCUMENTS

| | | | |
|---|---|---|---|
| 9,973,698 | B2 | 5/2018 | Pham et al. |
| 10,229,505 | B2 | 3/2019 | Ding et al. |
| 10,257,432 | B2 | 4/2019 | Kussel |
| 10,473,456 | B2 | 11/2019 | Nishimura et al. |
| 10,565,714 | B2 | 2/2020 | Hunt |
| 10,671,083 | B2 * | 6/2020 | Zhu ............... G01S 17/42 |
| 2013/0322697 | A1 | 12/2013 | Grindstalf et al. |
| 2017/0140229 | A1 * | 5/2017 | Ogata ............... B60W 30/0956 |
| 2021/0221368 | A1 * | 7/2021 | Lavi ............... G06K 9/00791 |
| 2021/0245742 | A1 * | 8/2021 | Ha ............... B60W 30/09 |
| 2021/0295530 | A1 * | 9/2021 | Janjic ............... G06T 7/20 |

FOREIGN PATENT DOCUMENTS

| | | |
|---|---|---|
| EP | 2479537 A3 | 6/2014 |
| WO | 2018204656 A1 | 11/2018 |

OTHER PUBLICATIONS

Li et al., A New Moving Object Detection Approach with Adaptive Double Thresholds, 2013 Int. Conf. on Computation and Information Science, pp. 102-105 (Year: 2013).*

Lin, "Introduction to Motion Estimation with Optical Flow", Nanonets, at least as early as Feb. 26, 2020, pp. 1-35, NanoNet Technologies Inc.

Rahmaniar et al., "Real-Time Detection and Recognition of Multiple Moving Objects for Aerial Surveillance", Electronics 8 1373, Nov. 20, 2019, pp. 1-16, www.mdpi.com/journal/electronics.

Chen, Kaifei et al., "Marvel: Enabling Mobile Augmented Reality With Low Energy and Low Latency", SenSys '18, Nov. 4-7, 2018, Shenzhen, China, (c) 2018 Association for Computing Machinery, ACM ISBN 978-1-4503-5952-8/18/11, https://doi.org/10.1145/3274783.3274834, pp. 292 through 304.

European Patent Office, "Extended European Search Report from EP Application No. 21189518.0", from Foreign Counterpart to U.S. Appl. No. 16/989,264, dated Dec. 22, 2021, pp. 1 through 8, Published: EP.

Feng, Di et al., "Towards Safe Autonomous Driving: Capture Uncertainty in the Deep Neural Network for Lidar 3D Vehicle Detection", arXuv:18004.05132v2 [cs.Ro], Sep. 7, 2018, pp. 1 through 9, (c) IEEE to appear Proceedings of the 21st IEEE International Conference on Intelligent Transportation Systems.

Zhang, Yinlong, etal, "Monocular Camera and Imu Integration for Indoor Position Estimation", 978-1-4244-79290/14, (c) 2014 IEEE, pp. 1198 through 1201.

* cited by examiner

MACHINE LEARNING AND VISION-BASED APPROACH TO ZERO VELOCITY UPDATE OBJECT DETECTION

BACKGROUND

Zero velocity update (hereinafter "ZUPT") refers to any technique used to determine if an object, such as a vehicle, is stationary. Alternatively known as "motion detection", ZUPT techniques are useful for navigation estimation correction of an object during travel.

For example, many vehicles, including aircraft, rely on various types of navigation systems, such as an inertial navigation system (hereinafter "INS") for determining the position of the aircraft at a given point in time, either alone or in combination with other navigation systems (e.g. a Global Navigation Satellite System). However, one known issue with implementing inertial based navigation systems is the error accumulation that results from using inertial measurements from an estimation reference frame to determine position. ZUPT techniques can aid in reducing error accumulation by determining whether the aircraft has moved from the last calculated reference frame. When ZUPT is triggered, the information that the vehicle is stationary can be used to estimate the error characteristics of the subcomponents of the INS like accelerometer and gyroscope, which can ultimately improve the performance of the INS.

Existing ZUPT techniques employ a variety of means for detecting motion of a vehicle, Some rely on logic applied to inertial measurements of accelerometers and gyroscope. However, for low cost inertial sensors, it is difficult to reliably trigger ZUPT using logic on the measurements alone as they are too noisy. Some methods rely on imaging techniques to trigger ZUPT. Imaging techniques use feature extraction methods that can at times be inaccurate depending on the application. Additionally, most methods for ZUPT update use manually tuned thresholds to determine whether input data indicates the vehicle is moving. However, by itself, threshold comparison can be inflexible and inaccurate in some systems, and may require frequent calibration.

Therefore, a need exists for an improved means for detecting motion of a vehicle.

SUMMARY

In one embodiment, a method is provided. The method can be performed to determine if a vehicle is moving. The method comprises acquiring a first image corresponding to a first time period and acquiring a second image corresponding to a second time period. The first image and the second image are taken from a camera from a frame of reference of the vehicle. The method further comprises detecting, via an optical flow algorithm implemented over the entirety of the first and second images, a difference between one or more portions of the first image and a respective one or more portions of the second image, wherein the one or more image portions correspond to an object moving independent of the vehicle. Additionally, the method comprises removing the one or more image portions of the first and second images based on the difference. The method further comprises determining movement of the vehicle based on the remaining image portions via a machine learning algorithm.

In another embodiment, a system is provided. The system can be configured to detect motion of a vehicle. The system comprises one or more optical sensors, wherein the one or more optical sensors are configured to acquire a first image corresponding to a first time period and acquire a second image corresponding to a second time period. The first image and the second image are taken from a frame of reference of the vehicle. The system also comprises one or more processors. The one or more processors are configured to detect, via an optical flow algorithm implemented over the entirety of the first and second images, a difference between one or more portions of the first image and a respective one or more portions of the second image. The one or more image portions correspond to an object moving independent of the vehicle. Additionally, the one or more processors are configured to remove the one or more image portions of the first and second images based on the difference. The one or more processors are also configured to determine movement of the vehicle based on the remaining image portions via a machine learning algorithm.

In another embodiment, a non-transitory computer readable medium is provided. The computer readable medium is configured to implement a method for determining movement of a vehicle. The non-transitory computer readable medium comprises a processor-readable medium on which program instructions are embodied, wherein the program instructions are designed to be executed by at least one processor in a system. When executed, the program instructions cause the system to receive a first image corresponding to a first time period and receive a second image corresponding to a second time period. The first image and the second image are taken from a camera from a frame of reference of the vehicle. The program instructions further cause the system to detect, via an optical flow algorithm implemented over the entirety of the first and second images, a difference between one or more portions of the first image and a respective one or more portions of the second image. The one or more image portions correspond to an object moving independent of the vehicle. Additionally, the program instructions cause the system to remove the one or more image portions of the first and second images based on the difference. The program instructions also cause the system to determine movement of the vehicle based on the remaining image portions via a machine learning algorithm.

The details of one or more embodiments are set forth in the description below. The features illustrated or described in connection with one exemplary embodiment may be combined with the features of other embodiments. Thus, any of the various embodiments described herein can be combined to provide further embodiments. Aspects of the embodiments can be modified, if necessary to employ concepts of the various patents, applications and publications as identified herein to provide yet further embodiments.

BRIEF DESCRIPTION OF THE DRAWINGS

Exemplary features of the present disclosure, its nature and various advantages will be apparent from the accompanying drawings and the following detailed description of various embodiments. Non-limiting and non-exhaustive embodiments are described with reference to the accompanying drawings, wherein like labels or reference numbers refer to like parts throughout the various views unless otherwise specified. The sizes and relative positions of elements in the drawings are not necessarily drawn to scale. For example, the shapes of various elements are selected, enlarged, and positioned to improve drawing legibility. The particular shapes of the elements as drawn have been selected for ease of recognition in the drawings. One or more embodiments are described hereinafter with reference to the accompanying drawings in which.

DETAILED DESCRIPTION

Figure 1:
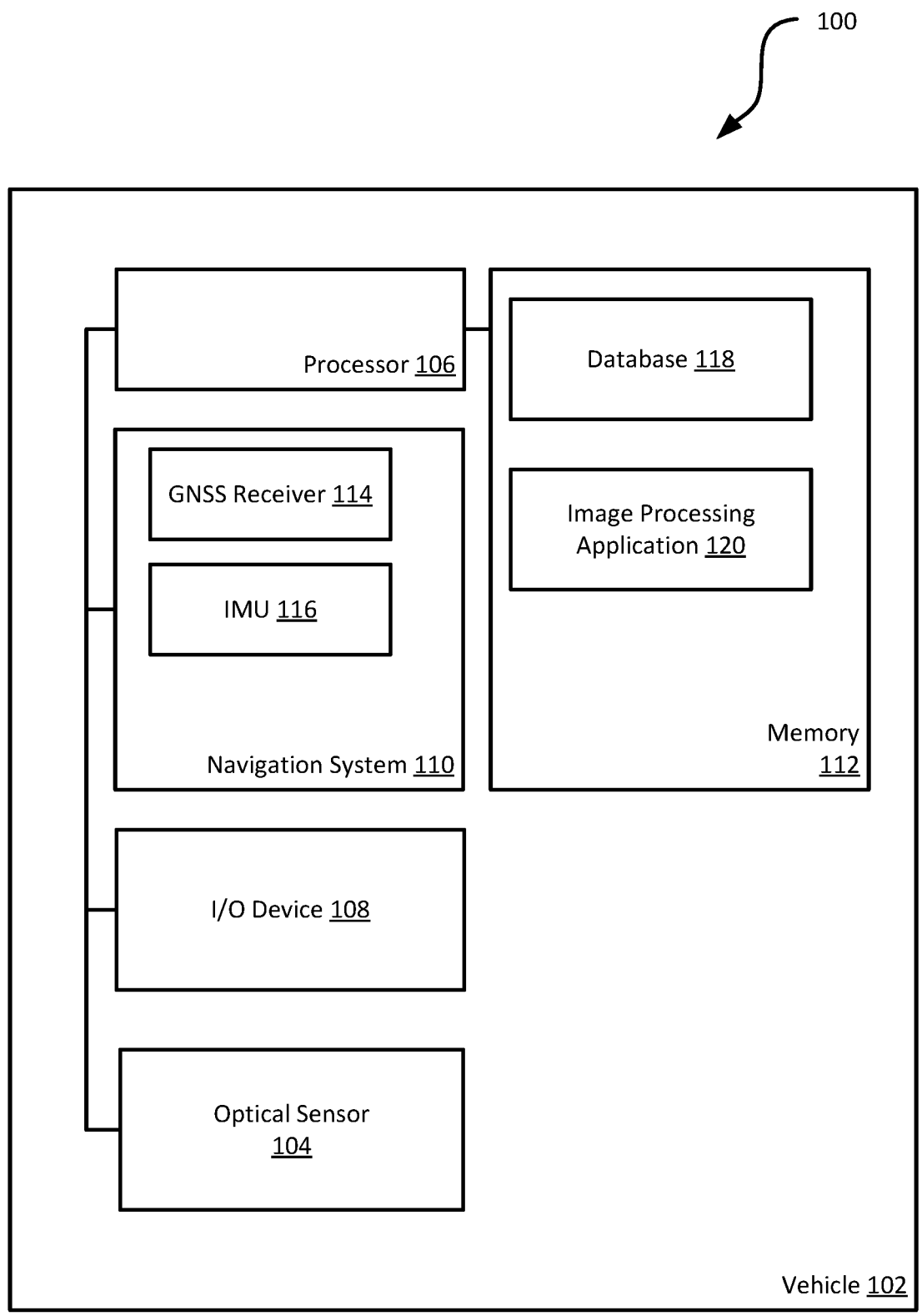
FIG. 1 depicts a block diagram of a system for detecting motion of a vehicle as described in one or more embodiments.

In the following detailed description, reference is made to the accompanying drawings that form a part hereof, and in which is shown by way of illustration specific illustrative embodiments. However, it is to be understood that other embodiments may be utilized, and that logical, mechanical, and electrical changes may be made. Furthermore, the method presented in the drawing figures and the specification is not to be construed as limiting the order in which the individual steps may be performed. The following detailed description is, therefore, not to be taken in a limiting sense.

The following disclosure describes techniques for detecting motion of an object. The systems and methods disclosed herein use of an optical flow algorithm executed over the entirety of an acquired image to extract apparent motion of the objects in the environment and remove portions (e.g. pixels) of the image that can be attributable to movement from objects in the environment independent from that of the object. The images may be acquired from a camera mounted on or otherwise coupled to the object, or may be acquired from other optical sensors configured to obtain an image of the external environment at varying time periods. Then, a machine learning classifier can be used to determine whether the object is moving based on the remaining portions of an image. Use of machine learning techniques enables for a more accurate and robust motion detection system than manual thresholding techniques alone. Additionally, the embodiments disclosed herein can provide a dynamic yet reliable mode of detecting object motion that can adapt to rapidly changing environments, making it useful for fast moving objects or objects that travel through a variety of environmental conditions.

The embodiments described can apply to any object capable of movement in an ether medium. A vehicle is illustrated throughout the disclosure for pedagogical illustration. In some areas, the vehicle may be further illustrated as a car or airplane. However, use of the term "vehicle" is not intended to be limiting and includes all classes of vehicles falling within the ordinary meaning of the term. This would include but not limited to, aerial traversing vehicles (e.g. commercial, non-commercial, or recreational aircraft), unmanned and/or space traversing vehicles (e.g. satellites, urban air mobility vehicles), water traversing vehicles (e.g. ships, submarines), and land traversing vehicles (e.g. automobiles including cars, trucks, motorcycles). Therefore, specific implementation of the interested object used to detect motion is used merely to illustrate the facets of the embodiments and not intended to be limiting or exclusive.

To illustrate the embodiments in greater detail, an optical sensor (e.g. a camera) acquires a first image corresponding to a perspective (e.g. reference frame) of a vehicle at a first time period. Later, the optical sensor then acquires a second image corresponding to a perspective of the vehicle at a second time period. After that, the first and second images are processed using a correspondence based algorithm (such as an optical flow algorithm) that returns the distance with which the data points (e.g. pixels) of the first image must be moved to appear like the second image. The results of the optical flow depend on which image is provided as the first image and second image. Forward optical flow means the optical flow obtained when the first image corresponds to a first frame (e.g. frame A) taken at a specific time and the second image corresponds to a frame (frame B) that is captured at a second period of time after the first frame. The backward optical flow means the optical flow obtained when the first image corresponds to e.g. frame B (as opposed to frame A) and the second image corresponds to e.g. frame A (as opposed to frame B). The forward and backward optical flow are compared to determine pixels corresponding to occluded objects, boundaries, and moving objects. These pixels and the corresponding optical flow values are removed and the remaining images and optical flow are used for subsequent analysis to determine movement of the vehicle itself.

In exemplary embodiments, the optical flow algorithm can be implemented by one or more artificial neural networks. Optical flow obtained using artificial neural networks can provide accurate and consistent values across all the pixels of the image in comparison to classical methods. The results are also robust over a wide variety of image conditions and environments. The remaining portions of the image and the corresponding optical flow are then input into a motion detection algorithm to determine whether the vehicle is moving. The motion detection algorithm includes a machine learning classifier that detects motion from the input images and produces an output that displays if the vehicle is moving or not moving. The use of a machine learning classifier enables more robust motion detection through dynamic threshold determination and ability to account for vehicular motion constraints in the motion detection algorithm instead of static thresholds manually set by the user.

In exemplary embodiments, a depth algorithm can also be used to detect movement of the vehicle. When a depth algorithm is used, means for determining the depth of the first and/or second image are performed. In some embodiments, depth can be acquired via light detecting and ranging LiDAR (LiDAR) sensor mounted to the vehicle or an analogous sensor. Additionally, or alternatively, depth may be acquired from an artificial neural network. As used herein, depth means a measure of the distance from an object in an image to the interested vehicle whose movement has not yet been determined. A depth algorithm can thus determine movement of the vehicle in addition to, or separately from, the motion detection algorithm described above.

Referring now to the Figures, FIG. 1 illustrates a block diagram of a system 100 configured to detect movement of a vehicle of interest. System 100 includes the interested object, which in FIG. 1 represents vehicle 102, in addition to an optical sensor 104 that may mounted to or otherwise coupled to vehicle 102 by physical, electrical, or communicative means. Vehicle 102 may include any of the classes of vehicles described above. Though FIG. 1 illustrates only one optical sensor 104, any number of sensors may be used based on the particular implementation as understood by one having ordinary skill in the art. One optical sensor is also further described for ease of explanation and consistency.

Optical sensor 104 is configured to acquire images from a reference frame of the vehicle such that the field of view of optical sensor 104 represents a vantage point from the vehicle 102. The images may be expressed as a graphical image format. For example, if optical sensor 104 includes a camera, the images may be represented as pixels. In some embodiments, the image data can be represented as a video sequence. Optical sensor 104 may include a camera or other type of image capture device configured to acquire an image; however, a camera is illustrated for pedagogical reasons. In one or more embodiments, memory 112 can be optionally configured to store image data captured by optical sensor 104 indirectly via image data sent to processor 106 or directly via coupling (not shown in FIG. 1). In embodiments where depth is used to determine movement of vehicle 102, optical sensor 104 may include a LiDAR sensor.

Additionally, system 100 may optionally include one or more input/output (I/O) devices or interfaces 108 coupled to processor 106. I/O device 108 may provide connections to components within system 100, such as those illustrated with respect to FIG. 1 or additional system(s) or device(s) external to system 100 and/or vehicle 102. I/O device 108 may also include a display or graphical user interface for illustrating the image processing techniques described herein, represented by image processing application 120. The display may also include information processed through navigation system 110 as described below.

System 100 further optionally includes navigation system 110. If the interested object is a vehicle, navigation system 110 is configured to determine navigation parameters or data relating to navigation of vehicle 102. Navigation system 110 may include GNSS receiver 114 and/or inertial measurement unit (IMU) 116, wherein the GNSS receiver 114 can provide satellite-based navigation data while IMU 116 may provide inertial-based navigation data (e.g. velocity, acceleration, rotation). GNSS receiver 114 can be configured according to known global or regional satellite navigation systems, including but not limited to, Global Positioning System (GPS), Galileo, BeiDou, or GLONASS systems. Data acquired by navigation system 110 may be provided to processor 106 or to one or more external systems or devices via I/O device 108. In some embodiments, velocity estimates from IMU 116 may be compared with velocity calculations acquired by optical flow and/or motion detection techniques described below. That is, velocity of the vehicle determined by the disclosed optical flow, depth, and/or motion detection techniques can be used to correct velocity estimations determined by navigation system 110, in particular IMU 116.

To detect motion, optical sensor 104 acquires a first image at a first time period from some vantage point of the vehicle. At some later period of time, e.g. second time period, optical sensor 104 then acquires a second image at that same vantage point. Optical sensor 104 may be configured to capture images at predetermined periods of time, for example, by a set timed delay, such as a timed clock signal sent by processor 106. Alternatively, optical sensor 104 can capture images via a continuous generation of image sequences, e.g. video data, wherein the video data comprises a plurality of images (image frames). Although a plurality of images can be captured and sent to processor 106, this disclosure refers to two such images for illustrative purposes and accordingly makes reference to the first and second images throughout the following description with the understanding that multiple images can be used where appropriate.

The images acquired by optical sensor 104 are sent to processor 106, which is configured to analyze the content of the images for features that indicate motion of vehicle 102. Processor 106 may include any one or combination of processors, microprocessors, digital signal processors, application specific integrated circuits, field programmable gate arrays, and/or other similar variants thereof. Processor 106 may also include, or function with, software programs, firmware, or other computer readable instructions for carrying out various process tasks, calculations, and control functions, used in the methods described below. These instructions are typically tangibly embodied on any storage media (or computer readable media) used for storage of computer readable instructions or data structures.

System 100 may include suitable computer readable media may include storage or memory media such as memory 112. Memory 112 can be implemented with any available storage media (or computer readable medium) that can be accessed by a general purpose or special purpose computer or processor, or any programmable logic device. Suitable computer readable media may include storage or memory media such as semiconductor, magnetic, and/or optical media, and may be embodied as storing instructions in non-transitory computer readable media, such as random access memory (RAM), read-only memory (ROM), non-volatile RAM, electrically-erasable programmable ROM, flash memory, or other storage media. Memory 112 may also include one or more databases, e.g. database 118, to store acquired image data. In various software embodiments, memory 112 includes image processing application 120, motion detection application 210, optical flow application 208, and artificial neural network 214, of which processor 106 can be configured to execute the instructions of each application.

Memory 112 may further include database 118. Database 118 is configured to store data acquired from navigation system 110 and optical sensor 104. Additionally, database 118 may store processing image data implemented by image processing application 120, namely optical flow, and depth or other motion detection processing. If I/O device 108 includes a display, processor 106 can retrieve stored processing data from database 118 and generate the data on the display.

Processor 106 uses the image data received from optical sensor 104 to determine movement of vehicle 102. This can be done via an algorithmic process that is described in further detail with reference to FIGS. 2-4. Still referring to FIG. 1, processor 106 can execute the instructions of image processing application 120. Image processing application 120 generally includes optical flow application 208, motion detection algorithm 210, and/or artificial neural network 214 illustrated in FIG. 2. Optical flow application 208 is configured to implement an optical flow algorithm on received image data. Motion detection algorithm 210 is configured to implement a motion detection algorithm on the processed optical flow to determine movement of vehicle 102. Motion detection application 210 may include a machine learning classifier and/or a depth algorithm. Furthermore, one or more of these applications may be performed by artificial neural network 214. Thus, image processing application 120 is a general representation of the processes used to process and analyze images acquired by optical sensor 104 to determine movement of vehicle 102. The specific process used to determine movement of vehicle 102 may vary depending on the precise embodiment; however, image processing application 120 may employ all or a combination of the above applications as desired.

Figure 2:
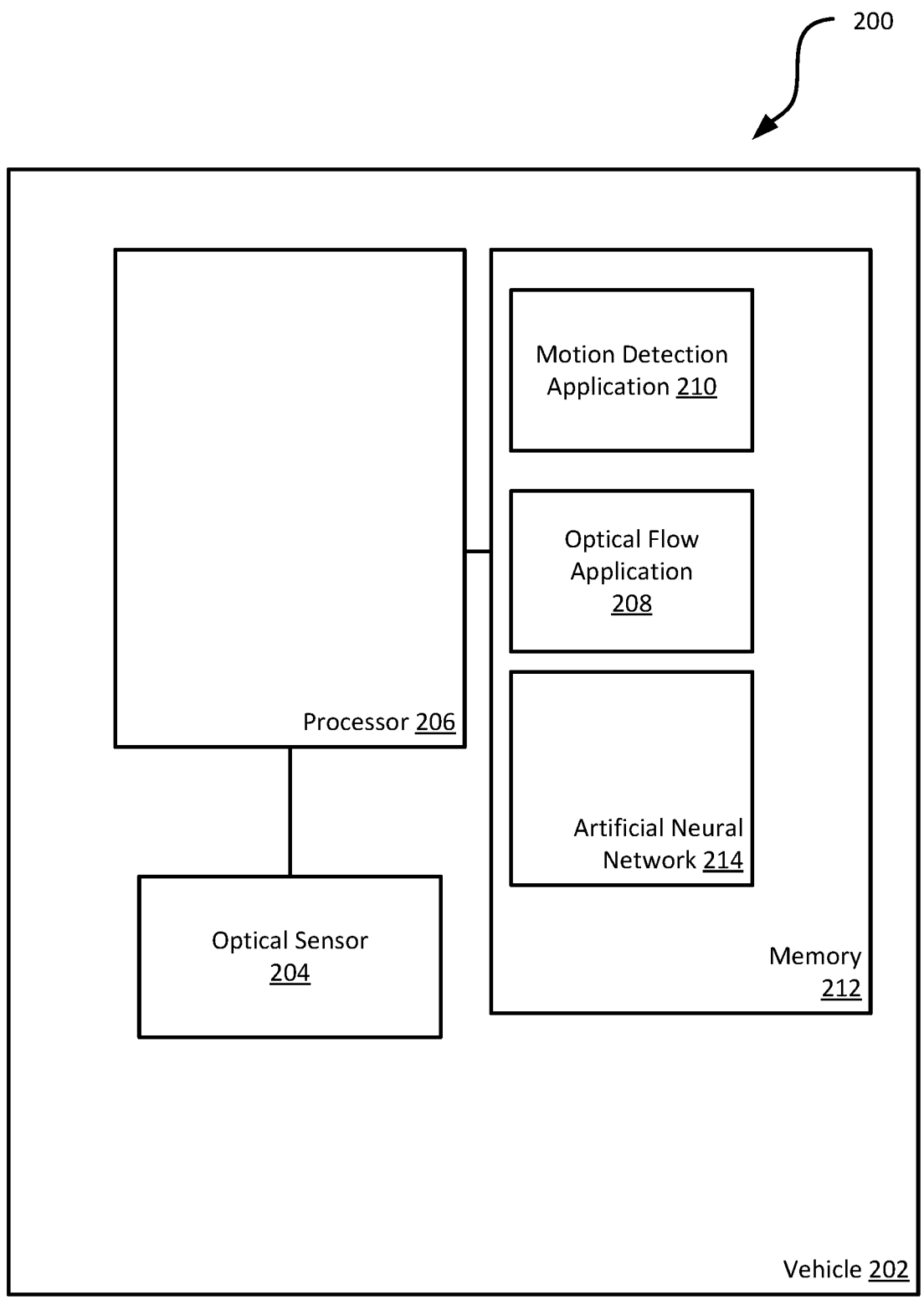
FIG. 2 depicts a block diagram of circuitry configured to detect motion of a vehicle using an artificial neural network as described in one or more embodiments.

FIG. 2 illustrates one embodiment of a system for detecting motion of a vehicle, which can be implemented using some or all of the components described with respect to FIG. 1. System 200 includes vehicle 202, which represents the object in question that may or may not be moving. One or more optical sensors 204 are physically, electrically, and/or communicatively coupled to vehicle 202, and may be mounted onto the exterior or interior of the vehicle. Additionally, system 200 includes optical flow application 208, motion detection application 210, and/or artificial neural network 214.

Similar to FIG. 1, optical sensor 204 acquires a first and second image from the same perspective of vehicle 202 corresponding to different time periods. Processor 206 receives the image data from optical sensor 204, which then uses the image data received from optical sensor 104 to determine movement of vehicle 102. Processor 206 can then determine the optical flow of the image data by implementing the instructions of optical flow application 208, which may optionally be further implemented by artificial neural network 214. Artificial neural network 214 may include multiple layers (e.g. a deep neural network). Such layers can include an input layer for inputting the image data of the first and second images for comparison, an output layer indicative of optical flow present between the first and second images and/or movement of the vehicle based on received optical flow input, and one or more hidden layers between the input and output layers. Additionally, artificial neural network 214 can be trained prior to use so that it can detect optical flow to a suitable degree of accuracy. For example, control image samples representing known positive (in which optical flow is known for each pixel of the sample) and negative (in which optical flow is not present) outputs can be used to train artificial neural network 214. Although FIG. 2 portrays a single artificial neural network, the functions of artificial neural network 214 can also be implemented in multiple neural networks. By determining optical flow via an artificial neural network, system 200 can ultimately determine movement of vehicle 202 with greater accuracy and flexibility than existing systems. Alternatively, the functions of optical flow application 208 and/or motion detection application 210 may be performed by processor 206 via one or more hardware modules.

Figure 3:
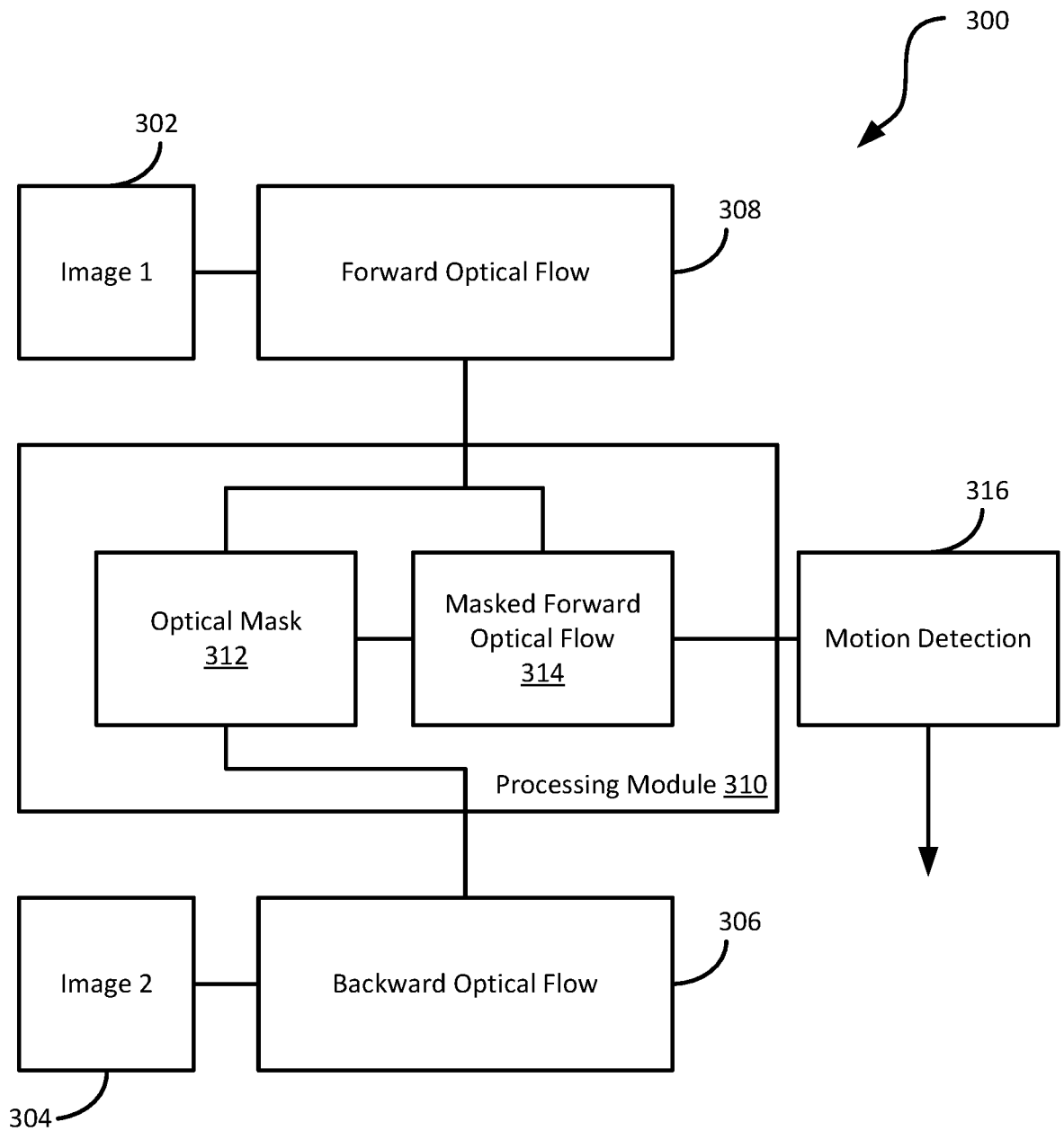
FIG. 3 depicts a flow chart of an optical flow algorithm for detecting motion of a vehicle as described in one or more embodiments.

Optical flow application 208 can determine the optical flow of objects that are moving independent to vehicle 202 by a technique known as optical flow, of which one embodiment is described in further detail in FIG. 3. The optical flow algorithm executed by processor 206 (e.g. optical flow application 208) is implemented throughout the entirety of the first and second images as opposed to selected portions of the images, such as the edges of the image dimensions or the center of the image. Any objects in the first and second images that are moving independently from vehicle 202 will impact the forward and backward optical flow differently; these impacted portions can be identified and isolated by optical flow application 208. If the results of the algorithm indicate that one or more image respective image portions between the first and second images (that is, an image portion from one image is different from the equivalent corresponding image portion of the second image), then processor 206 is configured to remove those image portions. The optical flow of the remaining image portions not removed can then be further analyzed to determine whether vehicle 202 itself is moving.

Motion detection application 210 is configured to detect movement of vehicle 202 based on the remaining image portions that do not correspond to movement of other objects. In some embodiments, motion detection application 210 includes a machine learning classifier algorithm. The machine learning algorithm can detect motion of vehicle 202 via dynamic threshold comparison. That is, motion detection application 210 can be trained to set appropriate thresholds used to detect motion based on the remaining image portions of the first and second images. Accordingly, dynamic threshold settings can enable motion detection without the use of manual thresholds set by a user. By implementing motion detection application 210 as a machine learning algorithm, motion can therefore be detected with improved accuracy and flexibility than existing motion detection systems.

Additionally or alternatively to the machine learning embodiments described above, motion detection application may also include a depth algorithm to determine whether vehicle 202 is moving. In such embodiments, optical sensor 204 may include any type of sensor configured to detect the depth of objects relative to vehicle 202. For example, optical sensor 204 may include a LiDAR sensor. An exemplary process for detecting movement of a vehicle using depth techniques is illustrated in more detail below with respect to FIG. 4, of which motion detection application 210 (executed by processor 106 or 206) may be configured to implement the described process.

Any of the embodiments described above may be implemented via one or more artificial neural networks. For example, the methodology of optical flow application 208 may be implemented using an artificial neural network configured to detect optical flow from received image data sent from optical sensor 204. The methodology of motion detection application 210 may also be implemented using an artificial neural network. In some embodiments, artificial neural network 214 may be configured to detect movement via a machine learning classifier. Additionally, or alternatively, artificial neural network 214 may detect motion via a depth algorithm, such as that described with respect to FIG. 4 below. Therefore, artificial neural network 214 can be configured to perform one or more of the processes described above, depending on the precise embodiment.

An illustration of an exemplary optical flow algorithm is shown in FIG. 3, which depicts a flow chart of an embodiment of the algorithmic process. Algorithm 300 may include processing module 310 for performing some of the functions described in the process. However, in some embodiments the functions of processing module 310 may be incorporated into one or more modules. Also, in some embodiments the described functions, such as the application of an optical mask as described in 312, may be performed by one or more artificial neural networks, for example artificial neural network 214 in FIG. 2.

Beginning at blocks 302 and 304, an optical sensor acquires an image of the environment from a vantage point of the vehicle at two different time periods. Image 1 (indicated at block 302) is acquired at a first time period, while image 2 (indicated at block 304) is acquired at a second time period. For purposes of illustration, assume the second time period is later than the first time period.

Then, at blocks 306 and 308, an optical flow algorithm is imposed on the first and second images. Such optical flow algorithms include those known in the art, which may be implemented by one or more artificial neural networks trained to detect optical flow from input data. On the first image, optical flow is detected from the first time period to the second time period when the second image was acquired, which creates a forward optical flow image. The forward optical flow image identifies all the image portions corresponding to objects that have moved from the first time period to the second time period. For example, if forward optical flow is present between the first image and the second image, at least one portion (e.g. a group of pixels) of the first image will have moved from the first image to a different portion of the second image. The forward optical flow will correspond to the distance and direction from the first image to the second image needed to recreate the identical portion of the first image in the second image. Optical flow can be represented as a vector quantity, and may have components of optical flow corresponding to a coordinate direction in a coordinate reference system (e.g. optical flow in the x or y direction in a Cartesian reference system).

Likewise, optical flow is detected at block 306 from the second time period back to the first time period when the first image was acquired, which creates a backward optical flow image. The backward optical flow image identifies all the image portions corresponding to objects that have moved from the second time period back from the first time period, and may also be represented as a vector quantity as described above.

The forward and backward optical flow images may optionally be sent to processing module 310, which analyzes the images for differences in optical flow patterns. At block 312, the forward and backward optical flow images may be combined and an optical mask applied to the combined image. The optical mask can remove image portions (e.g. pixels) corresponding to moving objects. Additionally, the optical mask can filter out other pixels corresponding to occlusions (e.g. image portions not visible in both the first and second images), reflective surfaces, and erroneous flow estimates from the optical flow algorithm. Then, at block 314, the optical mask is applied at the forward optical flow image.

In some instances, the forward optical flow and the backward optical flow may not be equivalent, in that the magnitudes and/or directions of forward and backward optical flow of corresponding portions of images are different in the forward and reverse directions. For example, assume that a group of pixels has a forward optical flow of +5 in the x direction and −1 in the y direction. In contrast, a subset of pixels in that group has a corresponding backward optical flow of −3 in the x direction and 0 in the y direction. If such differences exist, they can be identified between the optical mask of the combined image 312 and the optical mask of the forward optical flow image 314. For pedagogical purposes, a two-dimensional optical flow in a Cartesian coordinate system is illustrated, however, the amount of pixels, spatial dimensions, and reference coordinate system may be modified as appropriate.

Lastly, a motion detection algorithm is applied at block 316 to the masked forward optical flow image to detect the presence of motion in the vehicle. In one embodiment, the motion detection algorithm includes a machine learning classifier that compares the masked forward optical flow image to a threshold value indicative of whether the vehicle has moved. For example, if the mean of the masked optical flow values are greater than the threshold value, then the output of the motion detection algorithm would yield a positive result that indicates the vehicle is moving. In some embodiments, the motion detection algorithm is implemented via at least one artificial neural network. The artificial neural network can be configured to determine appropriate thresholds (e.g. by training the neural network to recognize positive results of motion of the vehicle in the masked forward optical flow image). In one embodiment, a mean-standard deviation filter is applied on the masked forward optical flow image to detect motion.

Figure 4:
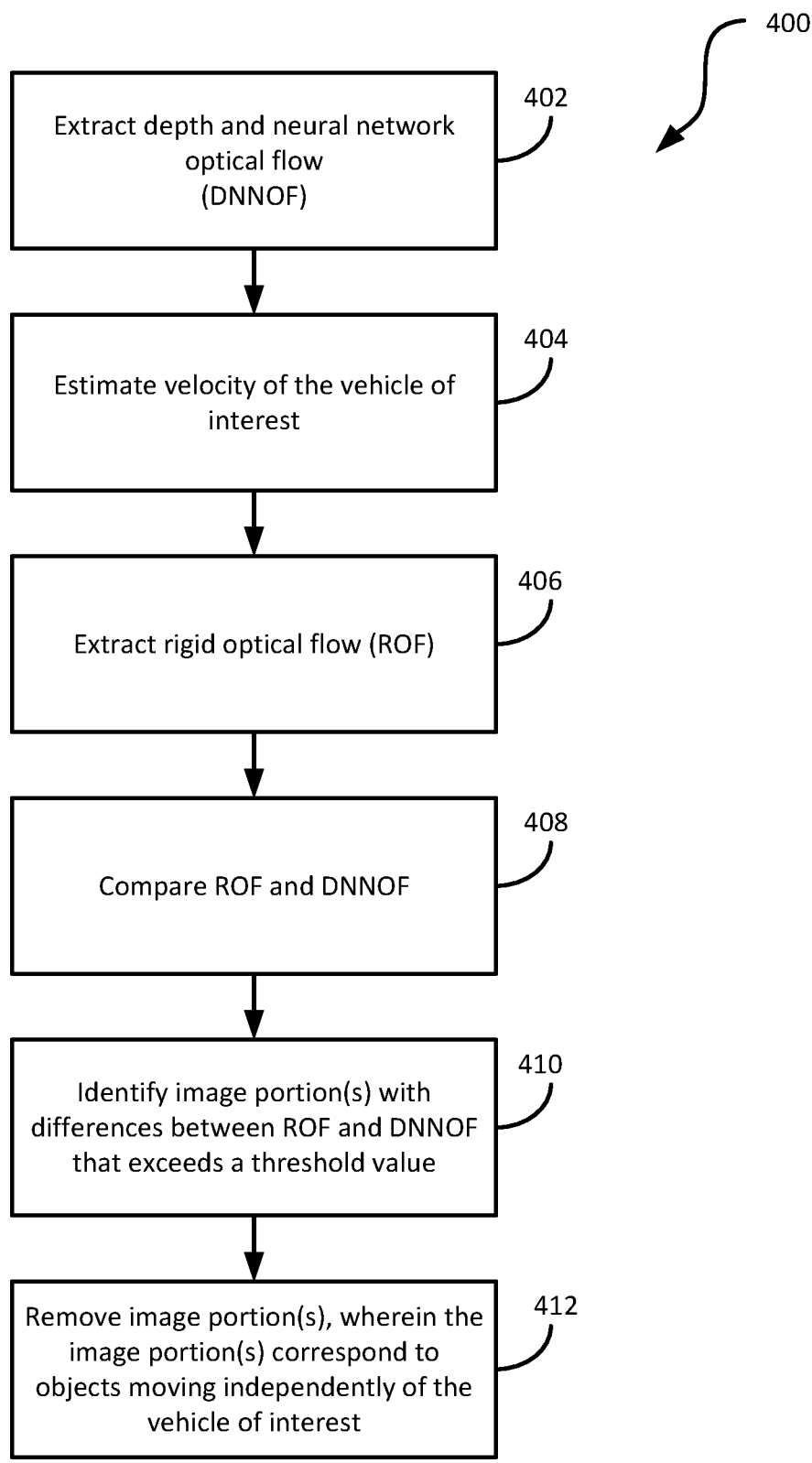
FIG. 4 depicts a flow chart of a method for detecting motion of objects independent of a vehicle using optical flow and depth techniques as described in one or more embodiments.

Referring to FIG. 4, the depth of a set of images can also be analyzed to determine motion of a vehicle. Therefore, in some embodiments, depth can be extracted and compared to a threshold value to detect image portions corresponding to objects moving independently of the vehicle. That is, the motion extraction algorithm applied at block 316 can analyze the forward and backward optical flow output in addition to depth of the received images. Or, motion detection may only be done via a depth algorithm, such as that described in FIG. 4. Referring to FIG. 4, the blocks of the flow diagram have been arranged in a generally sequential manner for ease of explanation; however, it is to be understood that this arrangement is merely exemplary, and it should be recognized that the processing associated with the methods described herein (and the blocks shown in the Figures) may occur in a different order (for example, where at least some of the processing associated with the blocks is performed in parallel and/or in an event-driven manner).

Beginning at block 402, the depth and neural network optical flow (DNNOF) are extracted from a first and second image, which may be done via conventional techniques in the art using an artificial neural network. Additionally, or alternatively, a LiDAR sensor may be used to extract depth of the images.

Method 400 then proceeds to block 404 by estimating the velocity of the vehicle of interest. Velocity can be determined by analyzing the optical flow and depth of the acquired images. Since optical flow provides an estimation of the relative motion of objects in an image sequence and depth provides an estimation of distance of objects in an image, velocity of the vehicle can be determined by extracting these quantities using known relationships of velocity, distance, and time. The optical flow analyzed can be made from the forward/backward optical flow described with respect to FIG. 3 and/or the neural network optical flow.

Proceeding to block 406, rigid optical flow is extracted from the first and second images. Rigid optical flow means the optical flow observed in an image sequence when all objects in the image are assumed to be stationary. Rigid optical flow can be determined based on the velocity estimation of the vehicle and depth measurements. That is, if the velocity of the vehicle and depth of the image are known, the rigid optical flow can be extracted from the image. The differences between the rigid optical flow (e.g. of the first image and/or the second image) and the true optical flow (e.g. the DNNOF) can be used to identify moving objects in the images as described below.

At block 408, the output from the depth and neural network optical flow ("DNNOF") is compared with the output from the rigid optical flow ("ROF"), for example, whether the difference between the DNNOF and the ROF exceeds a threshold value (indicated at block 410). The comparison is designed to identify image portions that signify independently moving objects from the vehicle. Portions corresponding to such objects will exhibit a greater difference between DNNOF and ROF values, which can be identified from an appropriately defined threshold limit. Method 400 ends at block 412, where the image portions that exceed the threshold value (and thus the portions corresponding to objects moving independent of the vehicle of interest) are removed from the first and second images.

The remaining image portions can be further processed to determine with greater accuracy the extent of movement of the vehicle.

Figure 5:
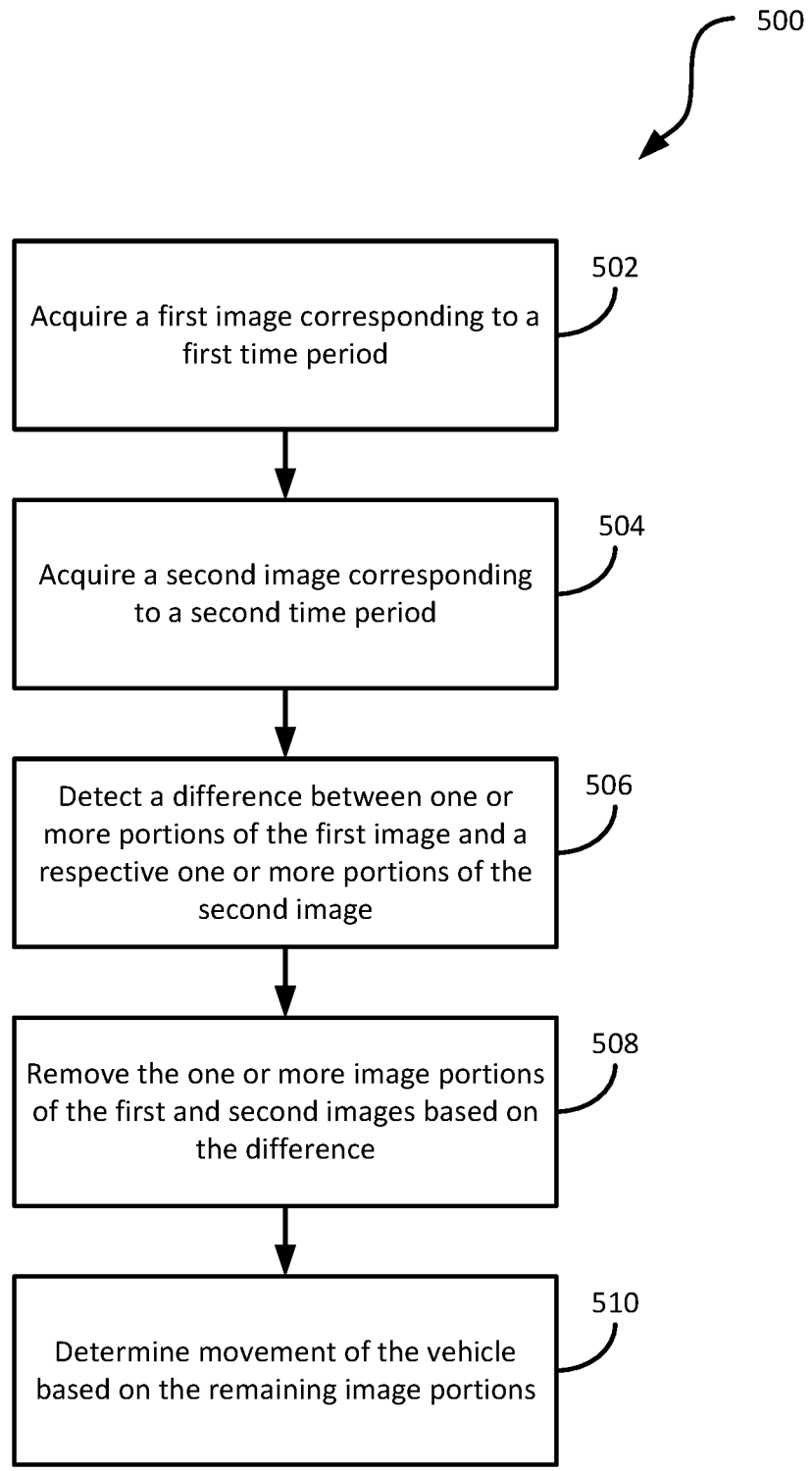
FIG. 5 depicts a flow chart of a method for detecting motion of a vehicle as described in one or more embodiments.

FIG. 5 illustrates a method for detecting motion of an object, such as a vehicle, based on analyzing optical flow and motion detection of acquired images. Method 500 may be performed using the optical flow and motion detection techniques described with respect to FIGS. 1-4 but may be implemented via other means as well. Like with respect to FIG. 4, the blocks of method 500 have been arranged in a generally sequential manner for ease of explanation; however, it is to be understood that this arrangement is merely exemplary, and it should be recognized that the processing associated with method 500 (and the blocks shown in the FIG. 5) may occur in a different order when applicable (for example, where at least some of the processing associated with the blocks is performed in parallel and/or in an event-driven manner).

Method 500 begins at block 502, where a first image is acquired corresponding to a first time period. The first image can be acquired via one or more optical sensors (e.g. cameras) onboard a vehicle, or mounted in or on the vehicle. Proceeding to block 504, a second image is acquired corresponding to a second time period. Optical sensors should be positioned such that the first and second images that are acquired represent a frame of reference, or perspective, of the vehicle and the images should correspond to the same frame of reference. In some embodiments, the optical sensor can include a LiDAR sensor, which may be configured to determine the depth of images captured by the optical sensor. However, depth may also be determined via one or more processing systems that receive the image data (e.g. processors 106 and 206), and may also be determined using an artificial neural network.

Method 500 then proceeds to block 506 by detecting a difference between one or more portions of the first image and a respective one or more portions of the second image. For example, an optical flow algorithm can be implemented over the entirety of the first and second images to detect optical flow differences between the images. In some embodiments, the algorithm can be implemented by an artificial neural network. Additionally, or alternatively, depth differences between the first and second images can also be detected as described with respect to FIG. 4. That is, optical flow can be detected via the forward and backward optical flow algorithm described with respect to FIG. 3, or if depth is used, optical flow can be detected via the DNNOF and rigid optical flow described with respect to FIG. 4.

Next, at block 508, method 500 removes the one or more image portions of the first and second images based on the difference. These differences correspond to movement of other objects independent of the vehicle in the first and second images, and should be discarded before a motion detection algorithm is applied on the remaining image portions.

Method 500 ends at block 510, where movement of the vehicle is determined based on the remaining image portions. Vehicle motion can be detected via a machine learning algorithm. The machine learning algorithm can detect motion by comparing the remaining image portions to a threshold value indicative of whether the vehicle has moved. For example, in one embodiment, if the mean of the masked optical flow values is greater than the threshold value, then the output of the motion detection algorithm would yield a positive result that indicates the vehicle is moving. In some embodiments, motion is detected based on the depth and optical flow of the received images. In one embodiment, a mean-standard deviation filter is applied on the remaining image portions to detect motion. The optical flow detection process and/or the motion detection process can be performed by one or more artificial neural networks, but in exemplary embodiments both processes are performed by artificial neural networks to provide a more robust and adaptive methodology for detecting movement of a vehicle of interest.

The methods and techniques described herein may be implemented in digital electronic circuitry, or with a programmable processor (for example, a special-purpose processor or a general-purpose processor such as a computer) firmware, software, or in various combinations of each. Apparatus embodying these techniques may include appropriate input and output devices, a programmable processor, and a storage medium tangibly embodying program instructions for execution by the programmable processor. A process embodying these techniques may be performed by a programmable processor executing a program of instructions to perform desired functions by operating on input data and generating appropriate output. The techniques may advantageously be implemented in one or more programs that are executable on a programmable system including at least one programmable processor coupled to receive data and instructions from, and to transmit data and instruction to, a data storage system, at least one input device, and at least one output device. Generally, a processor will receive instructions and data from a read-only memory and/or a random-access memory. Storage devices suitable for tangibly embodying computer program instructions and data include all form a of non-volatile memory, including by way of example semiconductor memory devices, such as EPROM, EEPROM, and flash memory devices; magnetic disks such as internal hard disks and removable disks; magneto-optical disks; and DVD disks. Any of the foregoing may be supplemented by, or incorporated in, specially-designed ASICs.

EXAMPLE EMBODIMENTS

Example 1 includes a method of determining if a vehicle is moving, the method comprising: acquiring a first image corresponding to a first time period; acquiring a second image corresponding to a second time period, wherein the first image and the second image are taken from a camera from a frame of reference of the vehicle; detecting, via an optical flow algorithm implemented over the entirety of the first and second images, a difference between one or more portions of the first image and a respective one or more portions of the second image, wherein the one or more image portions correspond to an object moving independent of the vehicle; removing the one or more image portions of the first and second images based on the difference; and determining movement of the vehicle based on the remaining image portions via a machine learning algorithm.

Example 2 includes the method of Example 1, wherein detecting a difference between the image portions between the first and second images further comprises detecting via a depth algorithm implemented over the entirety of the first and second images.

Example 3 includes the method of Example 2, wherein the depth algorithm and the optical flow algorithm is implemented by at least one artificial neural network.

Example 4 includes the method of any of Examples 2-3, wherein the depth algorithm is performed by at least one artificial neural network or a LiDAR sensor.

Example 5 includes the method of any of Examples 3-4, wherein the at least one artificial neural network comprises a deep neural network including at least one hidden layer.

Example 6 includes the method of any of Examples 1-5, wherein the vehicle includes at least one of: an automobile and an urban air mobility vehicle.

Example 7 includes the method of any of Examples 1-6, wherein determining movement of the vehicle further comprises comparing at least one mean value corresponding to optical flow of the first and second images to a threshold value, wherein the threshold value is indicative of movement of the vehicle.

Example 8 includes a system configured to detect motion of a vehicle, the system comprising: one or more optical sensors, wherein the one or more optical sensors are configured to: acquire a first image corresponding to a first time period, and acquire a second image corresponding to a second time period, wherein the first image and the second image are taken from a frame of reference of the vehicle; and one or more processors, wherein the one or more processors are configured to: detect, via an optical flow algorithm implemented over the entirety of the first and second images, a difference between one or more portions of the first image and a respective one or more portions of the second image, wherein the one or more image portions correspond to an object moving independent of the vehicle; remove the one or more image portions of the first and second images based on the difference; and determine movement of the vehicle based on the remaining image portions via a machine learning algorithm.

Example 9 includes the system of Example 8, wherein to detect a difference between the image portions between the first and second images further comprises to detect via a depth algorithm implemented over the entirety of the first and second images.

Example 10 includes the system of Example 9, wherein the depth algorithm and the optical flow algorithm is implemented by at least one artificial neural network.

Example 11 includes the system of any of Examples 9-10, wherein the one or more optical sensors comprises a LiDAR sensor, and wherein the depth algorithm is performed by the LiDAR sensor.

Example 12 includes the system of any of Examples 10-11, wherein the at least one artificial neural network comprises a deep neural network including at least one hidden layer.

Example 13 includes the system of any of Examples 8-12, wherein the vehicle includes at least one of: an automobile or an urban air mobility vehicle.

Example 14 includes the system of any of Examples 8-13, wherein to determine movement of the vehicle further comprises to compare at least one mean value corresponding to optical flow of the first and second images to a threshold value, wherein the threshold value is indicative of movement of the vehicle.

Example 15 includes a non-transitory computer readable medium for implementing a method for determining movement of a vehicle, the non-transitory computer readable medium comprising a processor-readable medium on which program instructions are embodied, wherein the program instructions are operable, when executed by at least one processor in a system, to cause the system to: receive a first image corresponding to a first time period; receive a second image corresponding to a second time period, wherein the first image and the second image are taken from a camera from a frame of reference of the vehicle; detect, via an optical flow algorithm implemented over the entirety of the first and second images, a difference between one or more portions of the first image and a respective one or more portions of the second image, wherein the one or more image portions correspond to an object moving independent of the vehicle; remove the one or more image portions of the first and second images based on the difference; and determine movement of the vehicle based on the remaining image portions via a machine learning algorithm.

Example 16 includes the non-transitory computer readable medium of Example 15, wherein to detect a difference between the image portions between the first and second images further comprises to detect via a depth algorithm implemented over the entirety of the first and second images.

Example 17 includes the non-transitory computer readable medium of Example 16, wherein the at least one processor includes at least one artificial neural network, wherein the depth algorithm and the optical flow algorithm is implemented by at least one artificial neural network.

Example 18 includes the non-transitory computer readable medium of Example 17, wherein the at least one artificial neural network comprises a deep neural network including at least one hidden layer.

Example 19 includes the non-transitory computer readable medium of any of Examples 15-18, wherein to determine movement of the vehicle further comprises to compare at least one mean value corresponding to optical flow of the first and second images to a threshold value, wherein the threshold value is indicative of movement of the vehicle.

Example 20 includes the non-transitory computer readable medium of any of Examples 16-19, wherein the vehicle includes at least one of: an automobile and an urban air mobility vehicle.

From the foregoing, it will be appreciated that, although specific embodiments have been described herein for purposes of illustration, various modifications may be made without deviating from the spirit and scope of the disclosure. Furthermore, where an alternative is disclosed for a particular embodiment, this alternative may also apply to other embodiments even if not specifically stated. Moreover, the circuit components described above may be disposed on a single or multiple integrated circuit (IC), one or more microprocessors, or one or more microcontrollers. In addition, one or more components of a described apparatus or system may have been omitted from the description for clarity or another reason. Furthermore, one or more components of a described apparatus or system that have been included in the description may be omitted from the apparatus or system. Unless otherwise described, the term "module" is intended to encompass circuitry for performing the described functions.

What is claimed is:

1. A method of determining if a vehicle is moving, the method comprising:
acquiring a first image corresponding to a first time period;
acquiring a second image corresponding to a second time period, wherein the first image and the second image are taken from a camera from a frame of reference of the vehicle;
creating, via an optical flow algorithm, a forward optical flow image based on the first and second images, wherein the forward optical flow image identifies any image portions corresponding to one or more objects that have moved from the first time period to the second time period;
creating, via the optical flow algorithm, a backward optical flow image based on the first and second images, wherein the backward optical flow image identifies any image portions corresponding to one or more objects that have moved from the second time period back from the first time period;

apply an optical mask to the forward optical flow image to produce a masked forward optical flow image;

detecting, via the optical flow algorithm, a difference between one or more portions of the first image and a respective one or more portions of the second image, wherein the one or more image portions correspond to an object moving independent of the vehicle;

removing the one or more image portions of the first and second images based on the difference; and determining movement of the vehicle based on the remaining image portions via a machine learning algorithm that is applied to the masked forward optical flow image;

wherein the machine learning algorithm detects motion of the vehicle via a dynamic threshold comparison, in which a dynamic threshold value is set by the machine learning algorithm to detect motion of the vehicle based on the remaining image portions.

2. The method of claim 1, wherein detecting a difference between the image portions between the first and second images further comprises detecting via a depth algorithm implemented over the entirety of the first and second images.

3. The method of claim 2, wherein the depth algorithm and the optical flow algorithm are implemented by at least one artificial neural network.

4. The method of claim 2, wherein the depth algorithm is performed by at least one artificial neural network or a light detecting and ranging (LiDAR) sensor.

5. The method of claim 3, wherein the at least one artificial neural network comprises a deep neural network including at least one hidden layer.

6. The method of claim 1, wherein the vehicle comprises an air traversing vehicle, a water traversing vehicle, or a space traversing vehicle.

7. The method of claim 1, wherein determining movement of the vehicle further comprises comparing at least one mean value corresponding to optical flow of the first and second images to the dynamic threshold value, wherein the dynamic threshold value is indicative of movement of the vehicle.

8. A system comprising:
one or more optical sensors coupled to a vehicle, wherein the one or more optical sensors are configured to:
acquire a first image corresponding to a first time period, and
acquire a second image corresponding to a second time period, wherein the first image and the second image are taken from a frame of reference of the vehicle; and
one or more processors, wherein the one or more processors are configured to:
create, via an optical flow algorithm, a forward optical flow image based on the first and second images, wherein the forward optical flow image identifies any image portions corresponding to one or more objects that have moved from the first time period to the second time period;
create, via the optical flow algorithm, a backward optical flow image based on the first and second images, wherein the backward optical flow image identifies any image portions corresponding to one or more objects that have moved from the second time period back from the first time period;
apply an optical mask to the forward optical flow image to produce a masked forward optical flow image;
detect, via the optical flow algorithm, a difference between one or more portions of the first image and a respective one or more portions of the second image, wherein the one or more image portions correspond to an object moving independent of the vehicle;
remove the one or more image portions of the first and second images based on the difference; and
determine movement of the vehicle based on the remaining image portions via a machine learning algorithm that is applied to the masked forward optical flow image;
wherein the machine learning algorithm is operative to detect motion of the vehicle via a dynamic threshold comparison, in which a dynamic threshold value is set by the machine learning algorithm to detect motion of the vehicle based on the remaining image portions.

9. The system of claim 8, wherein to detect a difference between the image portions between the first and second images further comprises to detect via a depth algorithm implemented over the entirety of the first and second images.

10. The system of claim 9, wherein the depth algorithm and the optical flow algorithm are implemented by at least one artificial neural network.

11. The system of claim 9, wherein the one or more optical sensors comprises a LiDAR sensor, and wherein the depth algorithm is performed by the LiDAR sensor.

12. The system of claim 10, wherein the at least one artificial neural network comprises a deep neural network including at least one hidden layer.

13. The system of claim 8, wherein the vehicle includes an air traversing vehicle, a water traversing vehicle, or a space traversing vehicle.

14. The system of claim 8, wherein to determine movement of the vehicle further comprises to compare at least one mean value corresponding to optical flow of the first and second images to the dynamic threshold value, wherein the dynamic threshold value is indicative of movement of the vehicle.

15. A non-transitory computer readable medium for implementing a method for determining movement of a vehicle, the non-transitory computer readable medium comprising a processor-readable medium on which program instructions are embodied, wherein the program instructions are operable, when executed by at least one processor in a system, to cause the system to:
receive a first image corresponding to a first time period;
receive a second image corresponding to a second time period, wherein the first image and the second image are taken from a camera from a frame of reference of the vehicle;
create, via an optical flow algorithm, a forward optical flow image based on the first and second images, wherein the forward optical flow image identifies any image portions corresponding to one or more objects that have moved from the first time period to the second time period;
create, via the optical flow algorithm, a backward optical flow image based on the first and second images, wherein the backward optical flow image identifies any image portions corresponding to one or more objects that have moved from the second time period back from the first time period;
apply an optical mask to the forward optical flow image to produce a masked forward optical flow image;

detect, via the optical flow algorithm, a difference between one or more portions of the first image and a respective one or more portions of the second image, wherein the one or more image portions correspond to an object moving independent of the vehicle;

remove the one or more image portions of the first and second images based on the difference; and determine movement of the vehicle based on the remaining image portions via a machine learning algorithm that is applied to the masked forward optical flow image;

wherein the machine learning algorithm is operative to detect motion of the vehicle via a dynamic threshold comparison, in which a dynamic threshold value is set by the machine learning algorithm to detect motion of the vehicle based on the remaining image portions.

16. The non-transitory computer readable medium of claim 15, wherein to detect a difference between the image portions between the first and second images further comprises to detect via a depth algorithm implemented over the entirety of the first and second images.

17. The non-transitory computer readable medium of claim 16, wherein the at least one processor includes at least one artificial neural network, wherein the depth algorithm and the optical flow algorithm are implemented by at least one artificial neural network.

18. The non-transitory computer readable medium of claim 17, wherein the at least one artificial neural network comprises a deep neural network including at least one hidden layer.

19. The non-transitory computer readable medium of claim 15, wherein to determine movement of the vehicle further comprises to compare at least one mean value corresponding to optical flow of the first and second images to the dynamic threshold value, wherein the dynamic threshold value is indicative of movement of the vehicle.

20. The non-transitory computer readable medium of claim 15, wherein the vehicle is an urban air mobility vehicle.

* * * * *